United States Patent
Demers et al.

(10) Patent No.: US 6,416,284 B1
(45) Date of Patent: Jul. 9, 2002

(54) TURBINE BLADE FOR GAS TURBINE ENGINE AND METHOD OF COOLING SAME

(75) Inventors: Daniel Edward Demers, Ipswich; Robert Francis Manning; Paul Joseph Acquaviva, both of Newburyport, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/706,403

(22) Filed: Nov. 3, 2000

(51) Int. Cl.⁷ .................................................. F01D 5/18
(52) U.S. Cl. ............... 416/97 R; 416/96 R; 416/193 A; 415/115
(58) Field of Search .......................... 416/95, 92, 96 R, 416/97 R, 96 A, 97 A, 193 A, 1; 415/115, 116

(56) References Cited

U.S. PATENT DOCUMENTS

| | | | |
|---|---|---|---|
| 3,791,758 A | 2/1974 | Jenkinson | 415/116 |
| 5,340,278 A | * 8/1994 | Magowan | 416/97 R |
| 5,738,489 A | 4/1998 | Lee | 415/177 |
| 6,071,075 A | * 6/2000 | Tomita et al. | 416/97 R |
| 6,079,946 A | * 6/2000 | Suenaga et al. | 416/97 R |

FOREIGN PATENT DOCUMENTS

JP 402011801 A * 1/1990 ............... 416/97 R

* cited by examiner

*Primary Examiner*—Edward K. Look
*Assistant Examiner*—Richard Woo
(74) *Attorney, Agent, or Firm*—William Scott Andes Pierce Atwood

(57) ABSTRACT

A turbine blade includes a platform and an airfoil extending radially from the platform. An internal cooling circuit is formed in the airfoil for circulating a coolant therethrough to cool the airfoil. At least one supply passage is provided to direct some of the coolant that has passed at least partially through the internal cooling circuit onto the platform for cooling the platform.

21 Claims, 3 Drawing Sheets

US 6,416,284 B1

TURBINE BLADE FOR GAS TURBINE ENGINE AND METHOD OF COOLING SAME

BACKGROUND OF THE INVENTION

The present invention relates generally to gas turbine engines, and more particularly to internally cooled turbine rotor blades used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

The turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor in such a manner that the turbine rotor can do work.

The high pressure turbine components are exposed to extremely high temperature combustion gases. Thus, the turbine blades, nozzle vanes and inner and outer bands typically employ internal cooling to keep their temperatures within certain design limits. The airfoil of a turbine rotor blade, for example, is ordinarily cooled by passing cooling air through an internal circuit. The cooling air normally enters through a passage in the blade's root and exits through film cooling holes formed in the airfoil surface, thereby producing a thin layer or film of cooling air that protects the airfoil from the hot gases. Known turbine blade cooling circuits often include a plurality of radially oriented passages that are series-connected to produce a serpentine path, thereby increasing cooling effectiveness by extending the length of the coolant flow path.

The spaces fore and aft of the rotor disks, commonly referred to as the disk wheel spaces, are in fluid communication with the hot gas stream. Thus, the rotor disks are also subjected to high temperatures, particularly at the disk rim. To prevent overheating of the rotor disks, cooling air is used to purge the fore and aft disk wheel spaces, thereby limiting the ingestion of hot gases.

The cooling air for these cooling applications is usually extracted from the compressor. Because the extracted air leads to an associated thermodynamic loss to the engine cycle, it is desirable to keep the amount of air diverted for cooling to a minimum. However, advanced engine designs with increased thrust-to-weight ratios operate at higher turbine inlet temperatures. The higher temperatures require greater overall turbine cooling and make it necessary to cool the blade platform as well. Accordingly, there is a need for improved cooling of turbine rotor blades, including the blade platform, without increasing chargeable cooling flow.

SUMMARY OF THE INVENTION

The above-mentioned need is met by the present invention which provides a turbine blade including a platform and an airfoil extending radially from the platform. An internal cooling circuit is formed in the airfoil for circulating a coolant therethrough, and at least one supply passage is provided to direct coolant that has passed at least partially through the internal cooling circuit onto the platform.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
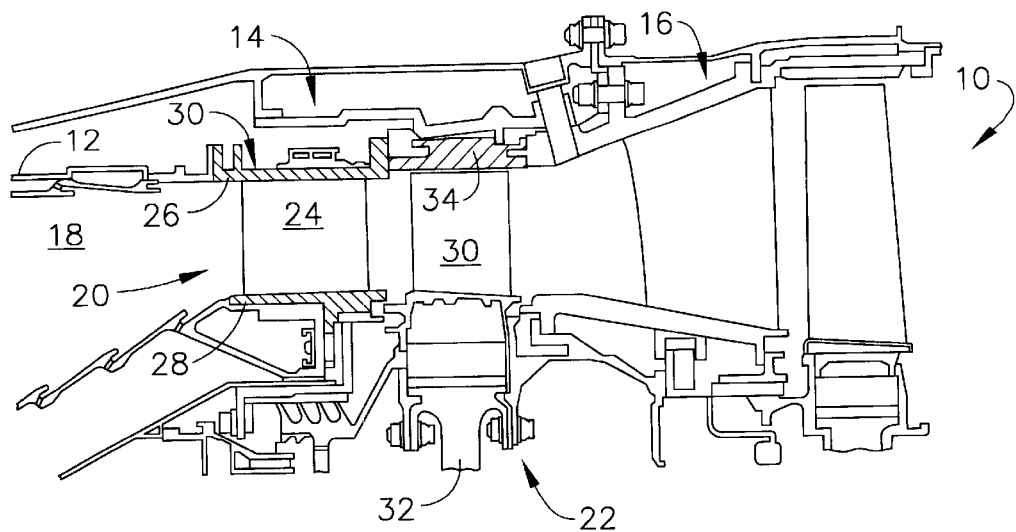
FIG. 1 is a partial cross-sectional view of a gas turbine engine having the turbine blades of the present invention.

Referring to the drawings wherein identical reference numerals denote the same elements throughout the various views, FIG. 1 shows a portion of a gas turbine engine 10 having, among other structures, a combustor 12, a high pressure turbine 14, and a low pressure turbine 16. The combustor 12 includes a generally annular hollow body defining a combustion chamber 18 therein. A compressor (not shown) provides compressed air that passes primarily into the combustor 12 to support combustion and partially around the combustor 12 where it is used to cool both the combustor liners and turbomachinery further downstream. Fuel is introduced into the forward end of the combustor 12 and is mixed with the air in a conventional fashion. The resulting fuel-air mixture flows into the combustion chamber 18 where it is ignited for generating hot combustion gases. The hot combustion gases are discharged to the high pressure turbine 14 located downstream of the combustor 12 where they are expanded so that energy is extracted. The hot gases then flow to the low pressure turbine 16 where they are expanded further.

The high pressure turbine 14 includes a turbine nozzle 20 and a turbine rotor 22. The turbine nozzle 20 includes a plurality of circumferentially spaced vanes 24 (only one shown in FIG. 1) that are supported between a number of arcuate outer bands 26 and arcuate inner bands 28. The vanes 24, outer bands 26 and inner bands 28 are arranged into a plurality of circumferentially adjoining nozzle segments that collectively form a complete 360° assembly. The outer and inner bands 26 and 28 of each nozzle segment define the outer and inner radial flowpath boundaries, respectively, for the hot gas stream flowing through the nozzle 20. The vanes 24 are configured so as to optimally direct the combustion gases to the turbine rotor 22.

The turbine rotor 22 includes a plurality of circumferentially spaced apart blades 30 (only one shown in FIG. 1) extending radially outwardly from a rotor disk 32 that rotates about the centerline axis of the engine 10. A plurality of arcuate shrouds 34 is arranged circumferentially in an annular array so as to closely surround the rotor blades 30 and thereby define the outer radial flowpath boundary for the hot gas stream flowing through the turbine rotor 22.

Figure 2:
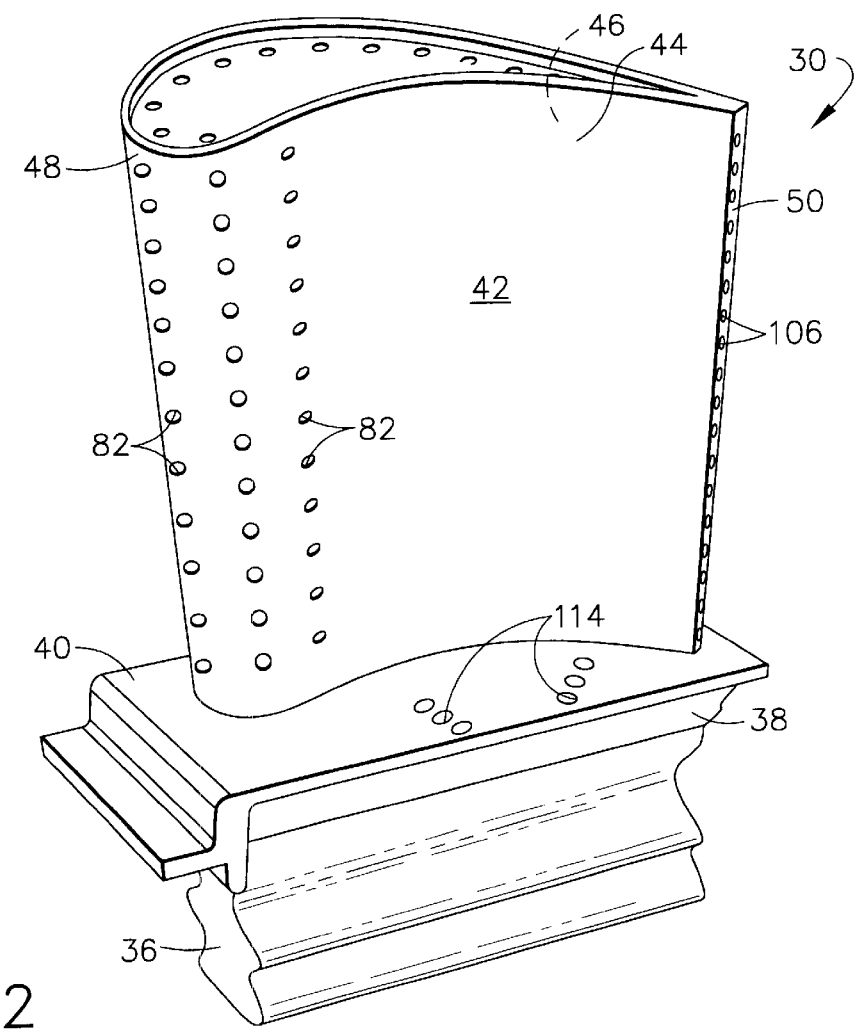
FIG. 2 is a perspective view of a turbine blade having the cooling configuration of the present invention.

An exemplary one of the turbine rotor blades 30 is illustrated in FIG. 2 and includes a conventional dovetail 36, which may have any suitable form including tangs that engage complementary tangs of a dovetail slot in the rotor disk 32 for radially retaining the blade 30 to the disk 32 as it rotates during operation. A blade shank 38 extends radially upwardly from the dovetail 36 and terminates in a solid platform 40 that projects laterally outwardly from and surrounds the shank 38. The platforms 40 of adjacent blades 30 abut one another to form a radially inner boundary for the hot gas stream.

A hollow airfoil 42 extends radially outwardly from the platform 40 and into the hot gas stream. The airfoil 42 has a concave pressure side 44 and a convex suction side 46 joined together at a leading edge 48 and at a trailing edge 50. The airfoil 42 may take any configuration suitable for extracting energy from the hot gas stream and causing rotation of the rotor disk 32. The blade 30 is preferably formed as a one-piece casting of a suitable superalloy, such as a nickel-based superalloy, which has acceptable strength at the elevated temperatures of operation in the gas turbine engine 10.

Figure 3:
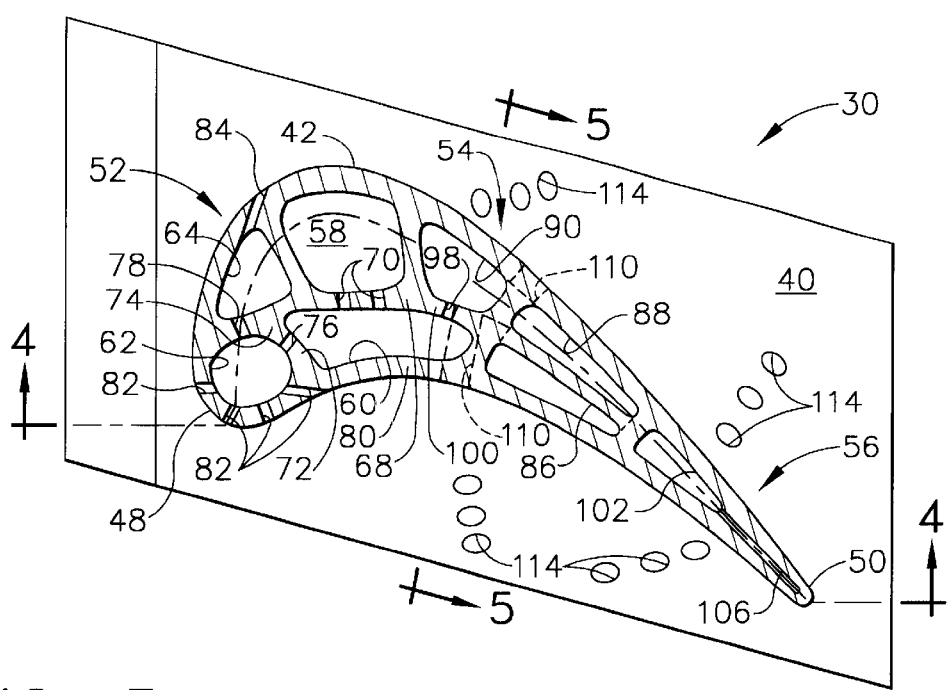
FIG. 3 is a cross-sectional view of the turbine blade of FIG. 2 taken through the airfoil.
Figure 4:
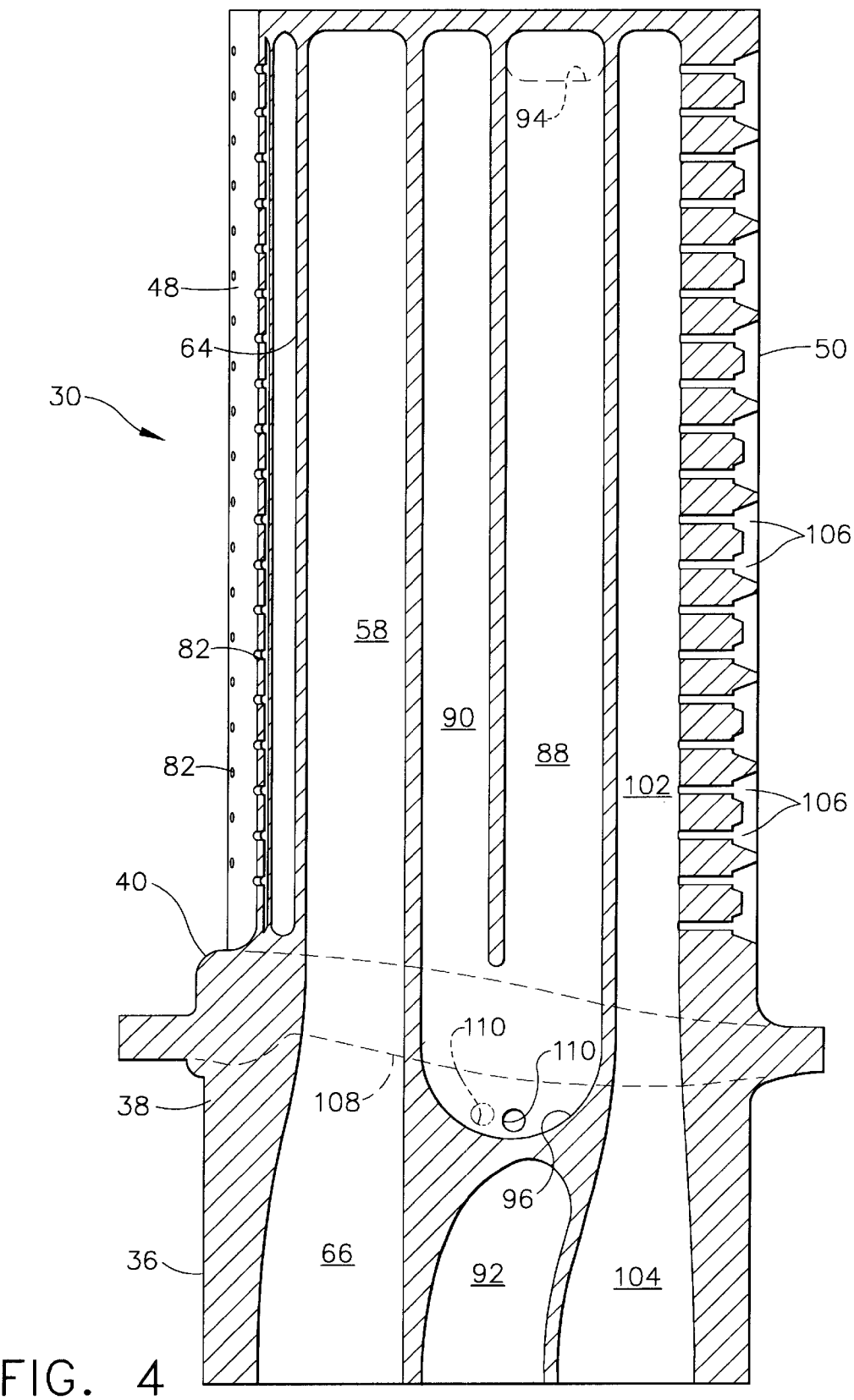
FIG. 4 is a cross-sectional view of the turbine blade taken along line 4—4 of FIG. 3.

Turning now to FIGS. 3 and 4, it is seen that the blade 30 has an internal cooling configuration that includes a leading edge circuit 52, a mid-chord circuit 54, and a trailing edge circuit 56. The leading edge circuit 52 includes first, second, third and fourth radially extending cavities 58, 60, 62 and 64, respectively, formed in the airfoil 42. The leading edge circuit 52 further includes a first inlet passage 66 formed through the dovetail 36 and the shank 38. The first inlet passage 66 is in fluid communication with the first cavity 58. The first and second cavities 58 and 60 are separated by a first rib 68, which has a first plurality of cross-over holes 70 formed therein. The third cavity 62 (which is located adjacent to the leading edge 48) is separated from the second cavity 60 by a second rib 72, and the fourth cavity 64 is separated from the third cavity 62 by a third rib 74. A second plurality of cross-over holes 76 is formed in the second rib 72, and a third plurality of cross-over holes 78 is formed in the third rib 74.

The first cavity 58 receives a coolant (usually a portion of the relatively cool compressed air bled from the compressor) through the first inlet passage 66, and the coolant travels radially outwardly through the first cavity 58. As best seen in FIG. 3, the coolant passes into the second cavity 60 through the first cross-over holes 70 and impinges on the inner surface of the pressure side airfoil wall 80 for cooling thereof. The coolant then passes through the second cross-over holes 76 into the third cavity 62. Some of the coolant in the third cavity 62 passes into the fourth cavity 64 through the third cross-over holes 78 and the remaining coolant exits the third cavity 62, and the airfoil 42, through a number of film cooling holes 82 that are in fluid communication with the third cavity 62. The coolant in the fourth cavity 64 exits the airfoil 42 through additional film cooling holes 84 that are in fluid communication with the fourth cavity 64.

The mid-chord circuit 54 includes fifth, sixth and seventh radially extending cavities 86, 88 and 90, respectively, that are fluidly connected in series in a serpentine arrangement. The fifth cavity 86 receives coolant from a second inlet passage 92 formed through the dovetail 36 and the shank 38. The coolant travels radially outwardly through the fifth cavity 86, passes into the sixth cavity 88 at an outer turn 94 and then flows radially inwardly through the sixth cavity 88. From there, a portion of the coolant passes into the seventh cavity 90 at an inner turn 96 and again flows radially outwardly. The coolant in the seventh cavity 90 passes into the second cavity 60 through a fourth plurality of cross-over holes 98 that are formed in a fourth rib 100, which separates the second cavity 60 and the seventh cavity 90. The coolant passing through the fourth cross-over holes 98 also impinges on the inner surface of the pressure side airfoil wall 80 for additional cooling thereof.

The trailing edge circuit 56 includes an eighth radially extending cavity 102 that receives coolant from a third inlet passage 104 formed through the dovetail 36 and the shank 38. This coolant travels radially outwardly through the eighth cavity 102 and exits the airfoil 42 through trailing edge slots 106 that extend from the eighth cavity 102 to the trailing edge 50.

The blade's internal cooling configuration, as described thus far, is being used as an example to facilitate disclosure of the present invention. However, it will be apparent from the subsequent description that the inventive concept of the present invention is not limited to turbine blades having the three cooling circuits 52, 54, 56 described above. Indeed, the present invention is applicable to a wide variety of cooling configurations.

Figure 5:
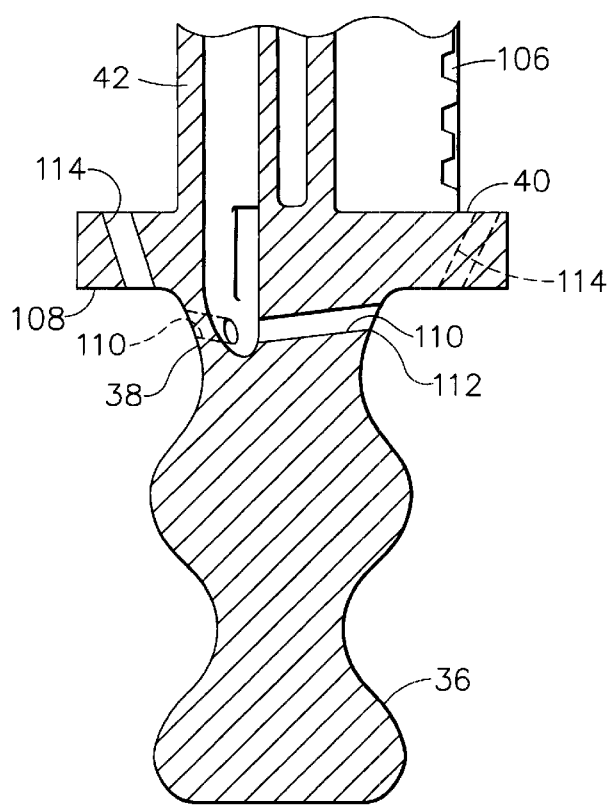
FIG. 5 is a cross-sectional view of the turbine blade taken along line 5—5 of FIG. 3.

Referring also to FIG. 5, it is seen that the present invention cools the platform 40 as well as the airfoil 42. Specifically, coolant is delivered to the underside 108 of the platform 40 via two supply passages 110 that extend from the inner turn 96 of the mid-chord circuit 54 to corresponding exterior outlets 112 formed in the blade shank 38. Thus, some of the coolant passing from the sixth cavity 88 to the seventh cavity 90 is diverted onto the platform underside 108 through the supply passages 110, thereby cooling the platform 40. As used herein, the underside 108 of the platform 40 refers to the platform's radially inner surface. The supply passages 110 are oriented so as to direct the coolant onto the platform underside 108. Preferably, the supply passages formed in the blade shank 38 so as to be slightly angled in a radially outward direction, thereby causing coolant to impinge on the platform underside 108.

The two supply passages 110 extend substantially laterally from respective sides of the mid-chord circuit 54 so as to supply coolant to both sides of the platform 40. Although the Figures show only one supply passage 110 on each side of the blade 30, it should be noted that configurations having multiple supply passages on each side are possible. Furthermore, the supply passages 110 are not limited to diverting coolant from the inner turn 96 of the mid-chord circuit 54. The supply passages can alternatively connect to other cavities of the blade 30, including cavities of the leading edge circuit 52 and the trailing edge circuit 56.

After cooling the platform underside 108, coolant discharged from the supply passages 110 will flow into the aft disk wheel space (i.e., the space aft of the rotor disk 32). This air flow will supplement the purging of this space, thereby reducing the amount of purge air that would be otherwise required for this purpose. In addition, the platform 40 has a plurality of film cooling holes 114 extending from the underside 108 to the platform's radially outer surface (i.e., the platform surface facing the hot gas stream). The film cooling holes 114 are generally located at locations on the platform 40 requiring film cooling and are slanted with respect to the outer platform surface so that some of the coolant discharged from the supply passages 110 will pass through the holes 114 and form a thin cooling film on the outer platform surface.

The foregoing has described a turbine blade 30 having an internal cooling configuration that includes cooling of the blade platform 40. The cooling configuration uses the same coolant to cool a portion of the airfoil 42 and to cool the platform 40. The present invention thus provides a benefit to the turbine cycle efficiency by reducing the total amount of coolant required for cooling the engine 10.

While specific embodiments of the present invention have been described, it will be apparent to those skilled in the art that various modifications thereto can be made without departing from the spirit and scope of the invention as defined in the appended claims.

What is claimed is:

1. A turbine blade comprising:
   a platform;
   an airfoil extending radially from said platform;
   an internal cooling circuit formed in said airfoil for circulating a coolant therethrough, said internal cooling circuit including a plurality of radially extending cavities fluidly connected in series in a serpentine arrangement with two of said radially extending cavities being connected at a turn; and
   means for directing coolant from said turn onto an exterior surface of said platform.

2. The turbine blade of claim 1 wherein said means for directing coolant comprises a second supply passage arranged to divert some coolant from said turn onto said platform.

3. The turbine blade of claim 2 wherein said at least one supply passage and said second supply passage divert coolant onto opposite sides of said platform.

4. The turbine blade of claim 1 wherein said platform has an underside and said supply passage is oriented to direct coolant onto said underside.

5. The turbine blade of claim 4 further comprising a plurality of film cooling holes formed in said platform.

6. The turbine blade of claim 1 wherein said supply passage is angled in a radially outward direction.

7. A turbine blade comprising:
   a platform;
   an airfoil extending radially from said platform;
   an internal cooling circuit formed in said airfoil for circulating a coolant therethrough, said internal cooling circuit including at least two cavities fluidly connected at a turn; and
   at least one supply passage arranged to divert some coolant from said turn onto an exterior surface of said platform.

8. The turbine blade of claim 7 further comprising a second supply passage arranged to divert some coolant from said turn onto said platform.

9. The turbine blade of claim 8 wherein said at least one supply passage and said second supply passage divert coolant onto opposite sides of said platform.

10. The turbine blade of claim 7 wherein said platform has an underside and said supply passage is oriented to direct coolant onto said underside.

11. The turbine blade of claim 10 further comprising a plurality of film cooling holes formed in said platform.

12. The turbine blade of claim 7 wherein said supply passage is angled in a radially outward direction.

13. A turbine blade for use in a gas turbine engine having a turbine rotor disk, said turbine blade comprising:
   a dovetail for mounting said turbine blade to said rotor disk;
   a shank extending from said dovetail;
   a platform joined to said shank;
   an airfoil extending radially from said platform;
   an internal cooling circuit formed in said airfoil for circulating a coolant therethrough, said internal cooling circuit including a plurality of radially extending cavities fluidly connected in series in a serpentine arrangement with two of said radially extending cavities being connected at a turn; and
   means for directing coolant from said turn onto an exterior surface of said platform.

14. The turbine blade of claim 13 wherein said means for directing coolant comprises a second supply passage arranged to divert some coolant from said turn onto said platform.

15. The turbine blade of claim 14 wherein said at least one supply passage and said second supply passage divert coolant onto opposite sides of said platform.

16. The turbine blade of claim 13 wherein said platform has an underside and said supply passage is oriented to direct coolant onto said underside.

17. The turbine blade of claim 16 further comprising a plurality of film cooling holes formed in said platform.

18. The turbine blade of claim 13 wherein said supply passage is angled in a radially outward direction.

19. The turbine blade of claim 13 wherein said supply passage extends through said shank.

20. In a gas turbine engine having a turbine rotor including at least one blade mounted to a rotor disk, said blade having a platform and an airfoil extending radially from said platform, a method of cooling said blade comprising the steps of:
   providing said airfoil with an internal cooling circuit having a plurality of radially extending cavities fluidly connected in series in a serpentine arrangement with two of said radially extending cavities being connected at a turn;
   introducing coolant into said internal cooling circuit; and
   diverting a portion of the coolant from said turn onto an exterior surface said platform.

21. The method of claim 20 wherein said platform has an underside and said coolant is directed onto said underside.

* * * * *